United States Patent
Noguchi (10) Patent No.: US 7,157,823 B2
(45) Date of Patent: Jan. 2, 2007

(54) BRUSHLESS VIBRATION MOTOR

(75) Inventor: Kazuo Noguchi, Isesaki (JP)

(73) Assignee: Tokyo Parts Industrial Co., Ltd. (KR)

(*) Notice: Subject to any disclaimer, the term of this patent is extended or adjusted under 35 U.S.C. 154(b) by 0 days.

(21) Appl. No.: 10/936,611

(22) Filed: Sep. 8, 2004

(65) Prior Publication Data

US 2005/0029880 A1 Feb. 10, 2005

Related U.S. Application Data

(63) Continuation of application No. 10/308,613, filed on Dec. 3, 2002, now abandoned.

(51) Int. Cl.
*H02K 7/06* (2006.01)

(52) U.S. Cl. ...................................... 310/81

(58) Field of Classification Search ................ 310/81, 310/90, 268
See application file for complete search history.

(56) References Cited

U.S. PATENT DOCUMENTS

| | | | |
|---|---|---|---|
| 4,910,420 A | 3/1990 | Hoover et al. ............. 310/68 B |
| 5,341,057 A | 8/1994 | Yamaguchi et al. .......... 370/81 |
| 5,373,207 A | 12/1994 | Yamaguchi et al. .......... 370/81 |
| 5,990,642 A * | 11/1999 | Park ........................ 318/254 |
| 6,057,753 A | 5/2000 | Myers .................... 340/407.1 |
| 6,222,291 B1* | 4/2001 | Boutaghou ................. 310/90 |
| 6,274,955 B1 | 8/2001 | Satoh et al. ................ 370/81 |
| 6,326,711 B1 | 12/2001 | Yamaguchi et al. .......... 370/81 |
| 6,365,995 B1 | 4/2002 | Fukuda et al. .............. 370/81 |
| 6,417,589 B1 | 7/2002 | Kuyama et al. ............. 370/81 |
| 6,566,772 B1* | 5/2003 | Yamaguchi ................. 310/81 |
| 6,573,627 B1* | 6/2003 | Sun ......................... 310/81 |
| 6,744,163 B1* | 6/2004 | Kajiwara et al. ............ 310/81 |
| 6,828,705 B1* | 12/2004 | Choi et al. ................. 310/81 |
| 6,836,039 B1* | 12/2004 | Choi et al. ................. 310/81 |
| 2004/0256930 A1* | 12/2004 | Kim ......................... 310/81 |

OTHER PUBLICATIONS

Abstract of JP200166173 "Flat Vibration Motor, And Portable Information Apparatus Equipped Therewith"; Patent No. Jp200166173; Publication date Jun. 16, 2000; Inventors: Yoshiaki, et al.; Applicant Matsuhita Electric Motor Ind Co. Ltd. Application No. JP 19980330658 19981120.
Abstract of JP10248203; "Cored Business Vibrating Motor"; Patent No. JP10248203; Publication Date Sep. 14, 1998; Inventors: Tado, et al; Applicant Tokyo Parts Ind. Co. Ltd; Application No. JP19970059849 19970227.

* cited by examiner

*Primary Examiner*—Dang Le (57) ABSTRACT

Disclosed is a brushless vibration motor having a driving circuit therein, which is capable of operating like a typical DC motor. The brushless vibration motor having an eccentric rotor R having an eccentric weight 5b, a rotor case 5 and a magnet 6 which has a plurality of magnetic poles arranged in the rotor case; a shaft 2 for supporting the eccentric rotor, a housing H for supporting the shaft, a stator S which is disposed around the shaft on a stator base 1 constructing a part of the housing and which consists of armature coils to drive the rotor, and a driving circuit member 1C which is mounted in a space K corresponding to an area of at least one armature coil.

4 Claims, 11 Drawing Sheets

BRUSHLESS VIBRATION MOTOR

This application is a continuation of U.S. application Ser. No. 10/308,613, filed Dec. 3, 2002 now abandoned.

BACKGROUND OF THE INVENTION

1. Field of the Invention

The present invention relates to a compact brushless vibration motor which contains a driving circuit member therein, while being used as a silent call device of a portable telecommunication apparatus such as a cellular phone, a personal communication system, a pager and the like.

2. Prior Arts

The present inventor had proposed a flat compact brushless vibration motor which is disclosed in the Japanese Utility Model laid-open Publication No. Heisei 4-137463 (already registered as Utility Model Registration No. 2549357) and the Japanese Patent laid-open Publication No. Heisei 10-248203.

Furthermore, Japanese Patent laid-open Publication No. 2000-166173 discloses the flat brushless vibration motor.

It is essential that the brushless motor should have a driving circuit member instead of a brush and a commutator. However, the conventional brushless motor has a structure in which no driving circuit member is contained, which also needs to have four or more lead lines to attach the driving circuit member to an outer surface of the motor. Therefore, there is a disadvantage in that the brushless motor cannot be handled as a DC motor having two electric terminals typically.

Furthermore, since a stator of the typical brushless motor has a plurality of armature coils which are evenly arranged around a periphery of the stator, there is a problem in that the electric parts including the driving circuit member and an integrated circuit (hereinafter, referred to as an IC) cannot be contained in the brushless motor.

SUMMARY OF THE INVENTION

Therefore, the present invention has been developed to solve the above-mentioned problems by making allowance for scarifying an efficiency of a brushless vibration motor as substantially operating in a non-load.

It is an object of the present invention to provide a compact brushless vibration motor containing a driving circuit member therein, thereby handling the brushless vibration motor as like a typical DC motor.

In order to accomplish the objects of the present invention, there is provided a brushless vibration motor comprising: an eccentric rotor having a rotor case, a magnet which has plural magnetic poles and which is arranged on an inner peripheral surface of the rotor case and an unbalance device disposed on a portion of an outer peripheral surface of the rotor case; a shaft for supporting the eccentric rotor; a housing for supporting the shaft, which has a stator base and a cover for enclosing the rotor; a stator for driving the rotor, which is disposed on the stator base to be around the shaft and which has a plurality of armature coils; and a circuit member for applying electric current to the stator, which is disposed at a predetermined portion on the stator base.

According to the present invention, particularly, the stator preferably is a cored type of stator including a plurality of salient poles on which the armature coils are respectively wound.

The stator includes at least two salient poles on which the armature coils are respectively wound, which is cooperated with the magnets having a southern magnetic pole and a northern magnetic pole alternatively arranged, leaving a radial gap therebetween.

Furthermore, the stator is consisting of at least two salient poles on which armature coils are respectively wound and which are arranged at an angular pitch of integer times to a width of a magnetic pole, and the driving circuit member having at least one sensor.

In the brushless vibration motor according to the present invention, a rotor cover is mounted on the stator to cover the eccentric rotor.

According to the present invention, the stator may include air-core armature coils.

According to the present invention, furthermore, the stator is accomplished by means of at least two three-phase air-core armature coils arranged at an angular pitch of 60 degrees.

According to the present invention, the driving circuit member may have no sensors.

According to the present invention, the stator has at least two air-core armature coils arranged at an angular pitch of integer times to a width of a magnetic pole, and a driving circuit member including at least one sensor.

According to the present invention, a rotor cover can be preferably mounted on the stator to cover the eccentric rotor.

According to the present invention, the brushless vibration motor contains a driving circuit member therein, resulting in only having two electricity supplying terminals, for example a plus pole terminal and a minus pole terminal.

According to the present invention, since a cored type of stator is used for the brushless vibration motor, parts having a relatively large height corresponding to a thickness of the stator can be mounted onto the motor.

According to the present invention, since the motor is a three-phase motor, no sensor may be adapted for the brushless vibration motor.

According to the present invention, one-phase type or two-phase type of one hole sensor can be mounted onto the brushless vibration motor.

According to the present invention, the brushless vibration motor has no danger, which can be easily handled.

According to the present invention, no three-phase sensor needs to be adapted for the brushless vibration motor.

According to the present invention, the brushless vibration motor may have one-phase type or two-phase type of one sensor.

According to the present invention, the brushless vibration motor has no danger, which can be easily handled.

BRIEF DESCRIPTION OF THE DRAWINGS

Other features and advantages of the present invention will become more apparent from the following description taken in connection with the accompanying drawings, wherein.

DESCRIPTION OF THE PREFERRED EMBODIMENTS

Hereinafter, the preferred embodiments of the present invention will be described in detail with reference to the accompanying drawings.

Figure 1:
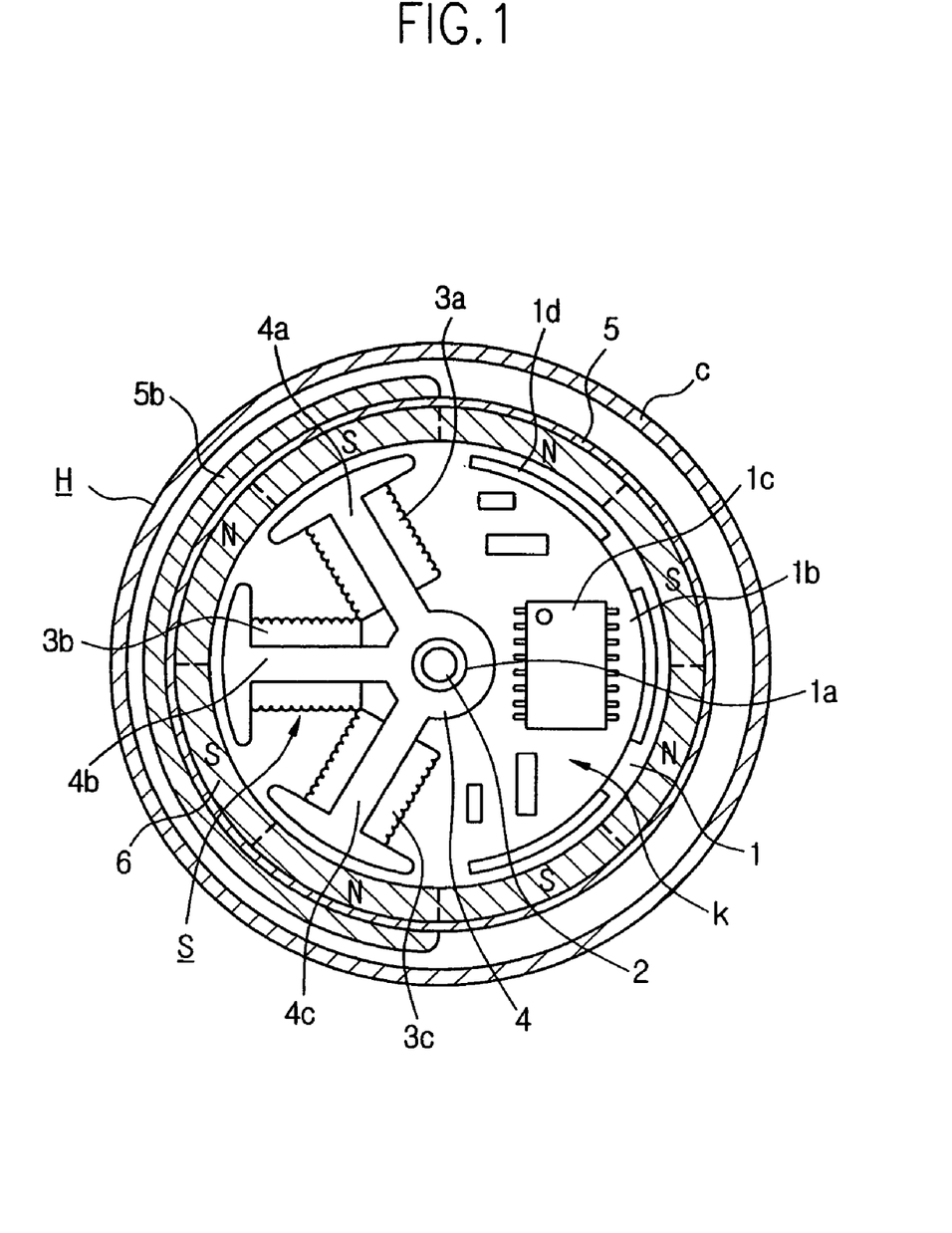
FIG. 1 is a cross-sectional view of a cored brushless vibration motor according to a first embodiment of the present invention, in which the brushless vibration motor is a three-phase DC motor to have a radial gap between a stator and a rotor.
Figure 2:
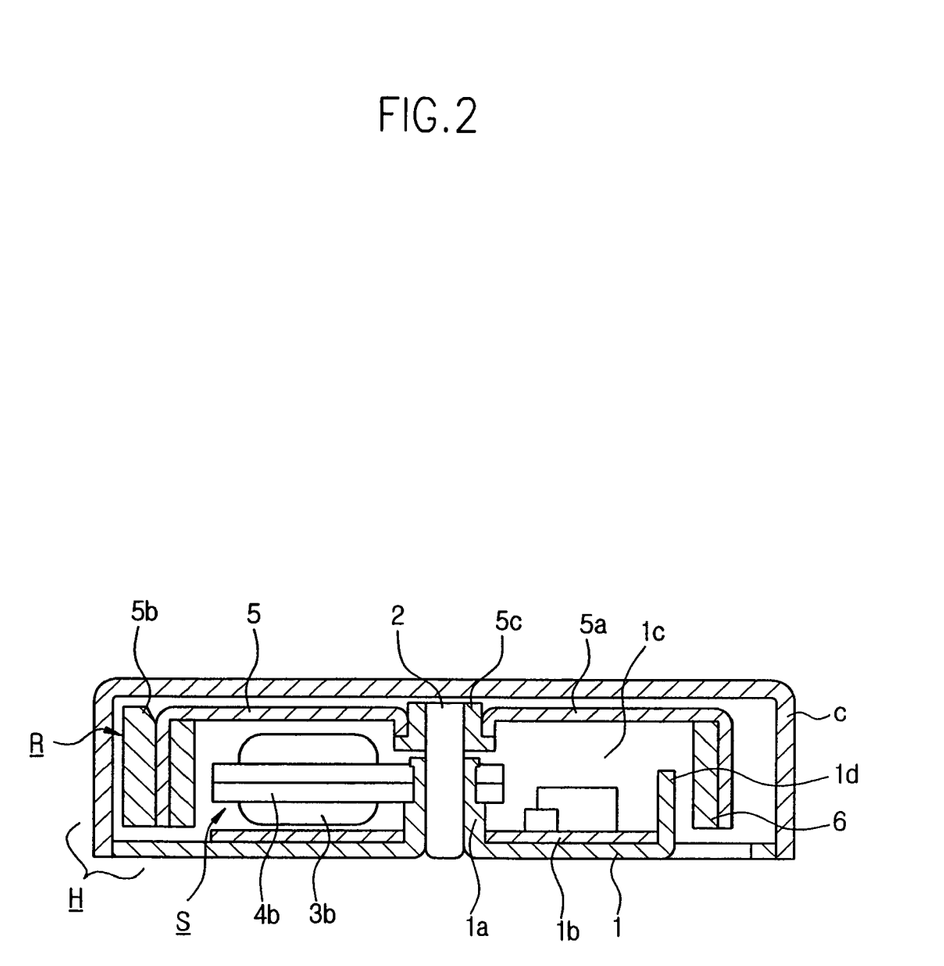
FIG. 2 is a longitudinally sectional view of the brushless vibration motor shown in FIG. 1.

FIGS. 1 and 2 show a cored type of a compact brushless vibration motor that is a three-phase DC motor and which has a radial gap between a stator and a rotor. That is, a stepped shaft supporting portion 1a is formed in such a manner of burring a center portion of a stator base 1 which is a part of a housing H. Then, a shaft 2 is press-fitted into the shaft supporting portion 1a. A stator core 4 is mounted onto the shaft supporting portion 1a with leaving a core cover (not shown) therebetween, which has a plurality of armature coils 3a, 3b and 3c respectively wound on salient poles 4a, 4b and 4c to establish a stator S.

The feature of the present invention is that three salient poles are removed from the stator having six salient poles which are arranged around a core of the stator at an even angular pitch of 60 degree, so as to form a space K in the stator base 1, and then a driving circuit member 1c having IC and chip typed electric parts attached on a glass fiber epoxy substrate 1b is contained in the brushless vibration motor.

Here, it is preferable that a narrow coil is wound on the salient poles several times in order to obtain a performance equivalent to that of a series of armature coils opposite each other.

Meanwhile, a rotor R is comprised of a cylindrical rotor case 5 in which notches 5a are formed in a ceiling portion thereof in order for the rotor case 5 to have a light weight and a small amount of eccentricity, and a narrow cylindrical magnet 6 securely attached on an inner side of the rotor case 5, which is rotatably mounted on the shaft by means of a bearing 5c installed at the center portion of the rotor case 5. The rotor case 5 has a semi-cylindrical weight 5b attached to an outer periphery surface thereof by welding, so as to reinforce an eccentric force of the rotor R. The magnet 6 has four southern magnetic poles and four northern magnetic poles alternatively arranged on the inner periphery of the rotor case 5 to help an operation of the rotor R.

Furthermore, a reference numeral 1d in the drawings denotes a dummy core risen from the stator base 1 to evenly distribute magnetic force from the magnet, and a reference character C indicates a cover attached at an edge to the stator base 1, which performs a protection of the eccentric rotor and which prevents a danger due to a roughness of an outer surface of the eccentric rotor when the rotor rotates.

The vibration motor is operated in a three phase unipolar manner or a bipolar manner without a sensor. The principle of operating the vibration motor is well known to those skilled in the art. Therefore, the description of the principle of the operating the vibration motor will be omitted.

Hereinafter, modified examples of the embodiment of the present invention or another embodiments of the present invention will be described. Like reference numerals are used to denote the like member or members having the same function, of which description will be omitted. Further, the cover C may not be shown in the following embodiments and modified examples.

Figure 3:
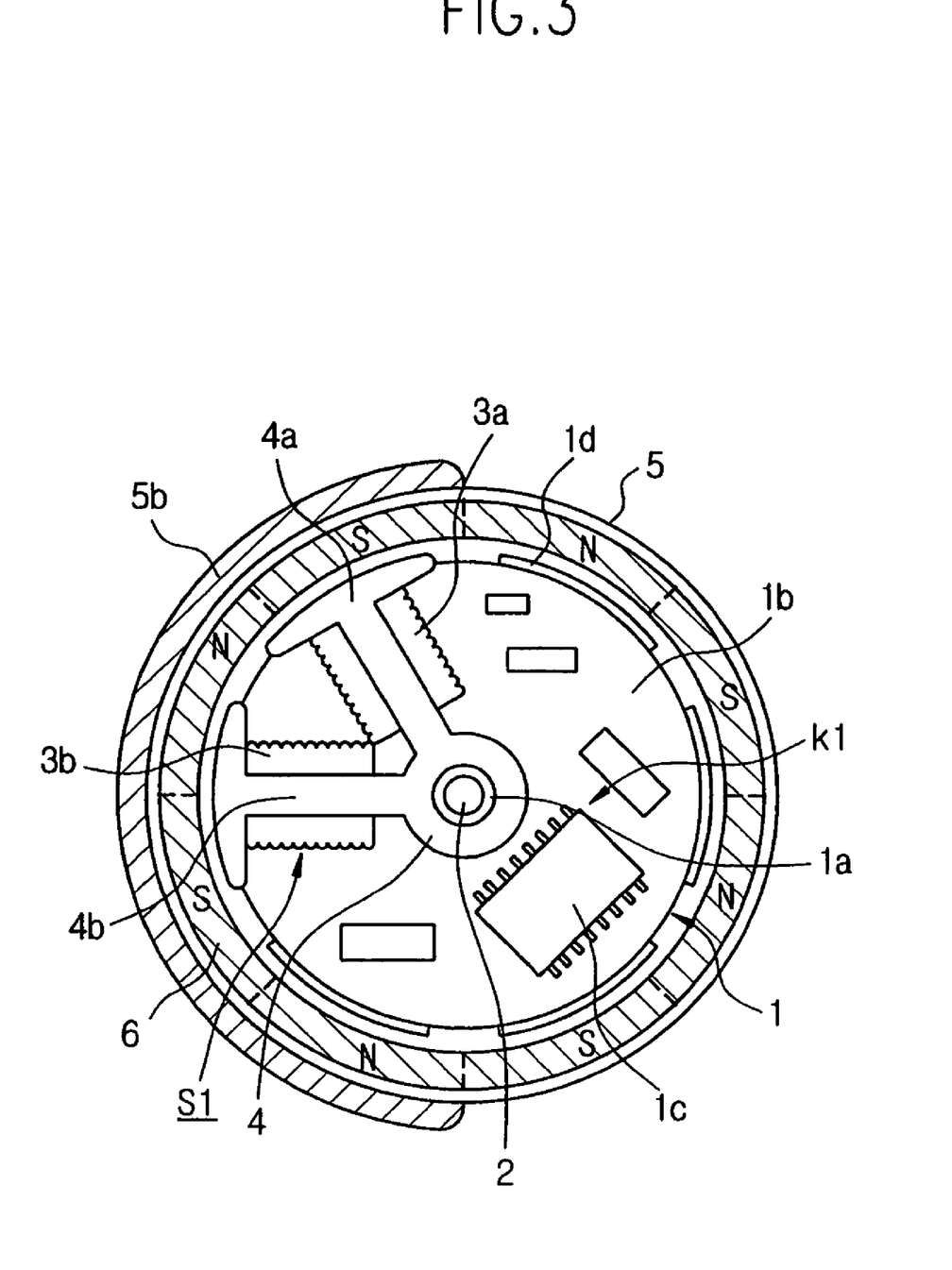
FIG. 3 is a cross-sectional view of the brushless vibration motor according to a first modified example of the present invention, shown in FIG. 1.

FIG. 3 shows the first modified example of the present invention, in which the stator S1 is provided with two salient poles having the armature coils 3a and 3b to reduce manufacturing cost. There is the stator S1 in which four armature coils are removed from six armature coils arranged in the typical stator. Thereby, it is possible that the above mentioned circuit member 1c is disposed at a space K1 in the vibration motor, as described above. Where the driving circuit member has no sensor, the vibration motor can be operated in a bipolar manner because it is not needed one-phase terminal among the three-phase terminals. Thus, the driving circuit member 1c can be reasonably received in the space K1 in the vibration motor.

Figure 4:
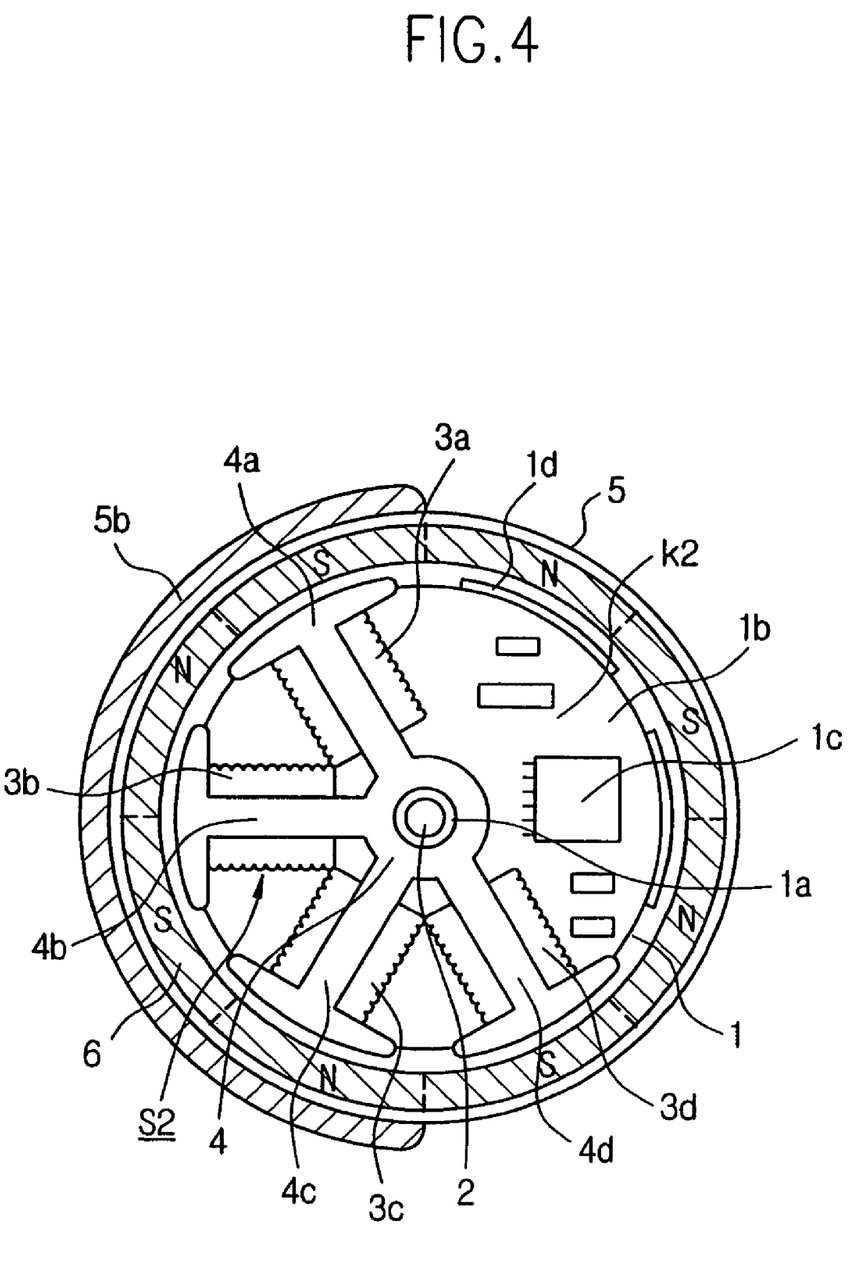
FIG. 4 is a cross-sectional view of the brushless vibration motor according to a second modified example of the present invention, shown in FIG. 1.

FIG. 4 shows the brushless vibration motor according to a second modified example of the present invention, in which a stator S2 has four salient poles 4a, 4b, 4c and 4d of which one salient pole 4a is opposite to another salient pole 4d. That is, the stator S2 has the same structure as that of the first embodiment of the present invention, except that the armature coils 3a and 3d respectively wound on the opposite salient poles 4a and 4d are in series connected with each other. Therefore, there is a space K2 in the motor, which is corresponding to that of disposing the two salient poles and in which the circuit member 1c can be disposed. It is preferable to mount a bare chip typed circuit member rather than an IC having no a sensor in this space K2.

Figure 5:
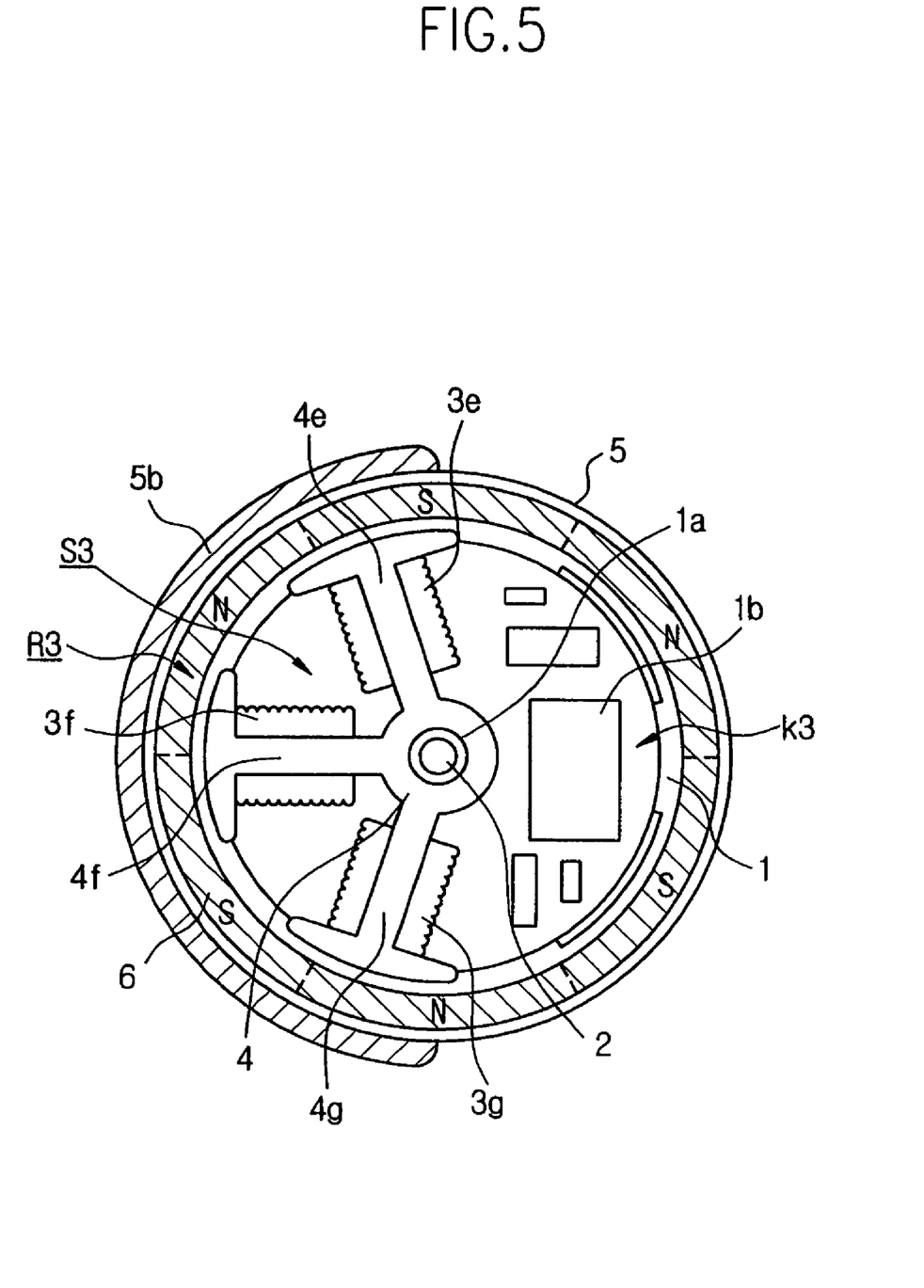
FIG. 5 is a cross-sectional view of the brushless vibration motor according to a third modified example of the present invention, shown in FIG. 1.

FIG. 5 shows a brushless vibration motor according to a third modified example of the present invention, in which a stator S3 has salient poles 4e, 4f and 4g arranged at an even angular pitch of 80 degrees on which armature coils 3e, 3f and 3g are respectively wound. A magnet having three southern magnetic poles and three northern magnetic poles alternatively arranged in the rotor case faces the stator S3, radially leaving a gap therebetween, which constructs the eccentric rotor R3.

In this case, the space K3 has an area capable of receiving one or more armature coil, in which the circuit member 1c can be mounted.

Furthermore, an angular pitch of three salient poles can be changed in a range of 70 degrees to 100 degrees by varying the size and shape of the salient poles.

Figure 6:
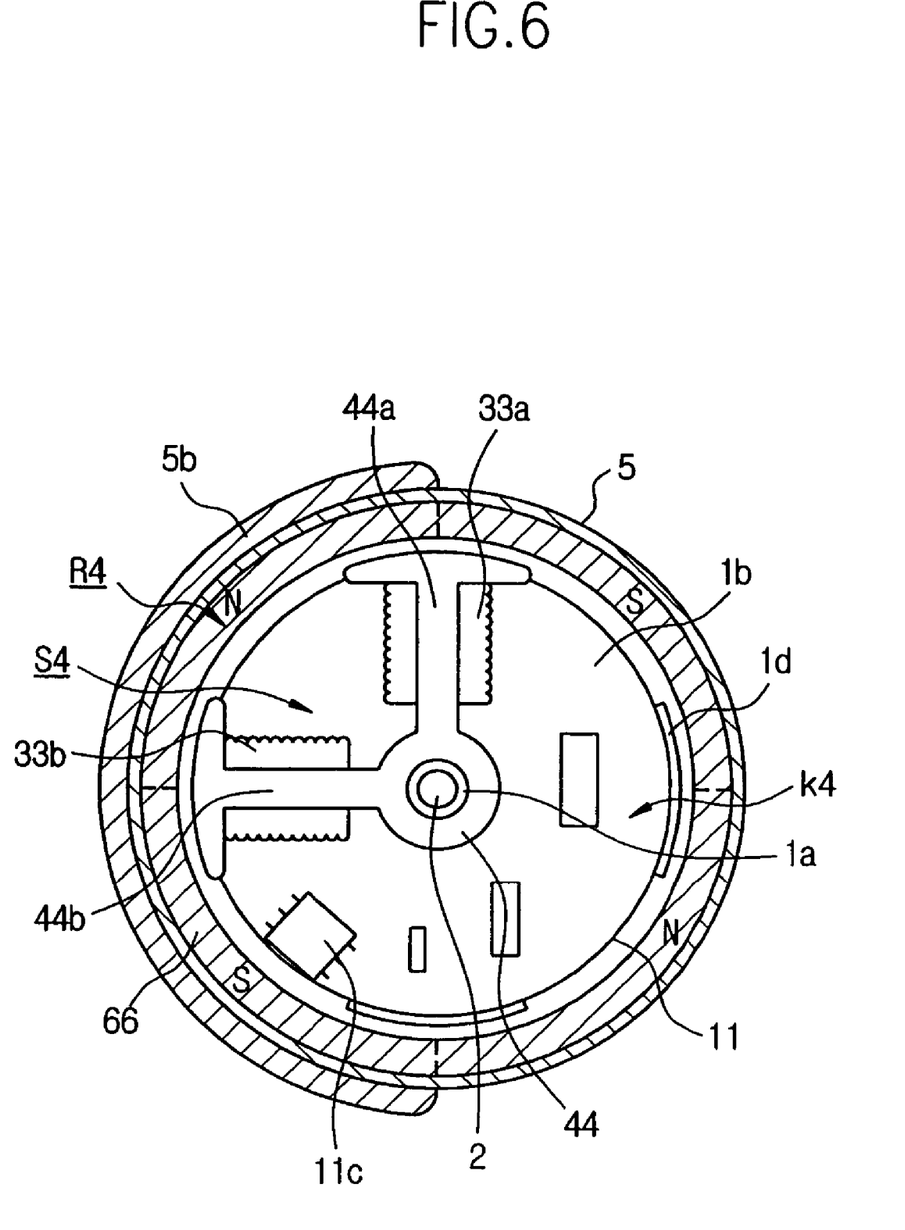
FIG. 6 is a cross-sectional view of a cored brushless vibration motor according to a second embodiment of the present invention, in which the brushless vibration motor has a radial gap between a stator and a rotor.

FIG. 6 shows a compact cored brushless vibration motor according to the second embodiment of the present invention, in which air-core typed armatures having a one hole IC are adapted to the brushless motor.

That is, a stator S4 drives an eccentric rotor R4 having a magnet that has two southern magnetic poles and two northern magnetic poles that are alternatively arranged on an inner periphery of a rotor case. The stator S4 includes a stator core 44 which is disposed on a stator base 11 to have two salient poles 44a and 44b which are arranged at an angular pitch (i.e. 90 degrees) corresponding to a width of a magnetic pole, and armature coils 33a and 33b respectively wound on each salient pole. As a space K4, capable of receiving two salient poles, is formed in the brushless motor, the driving circuit member including the one hole IC used as a sensor and another electric part can be received in the space K4.

Figure 7:
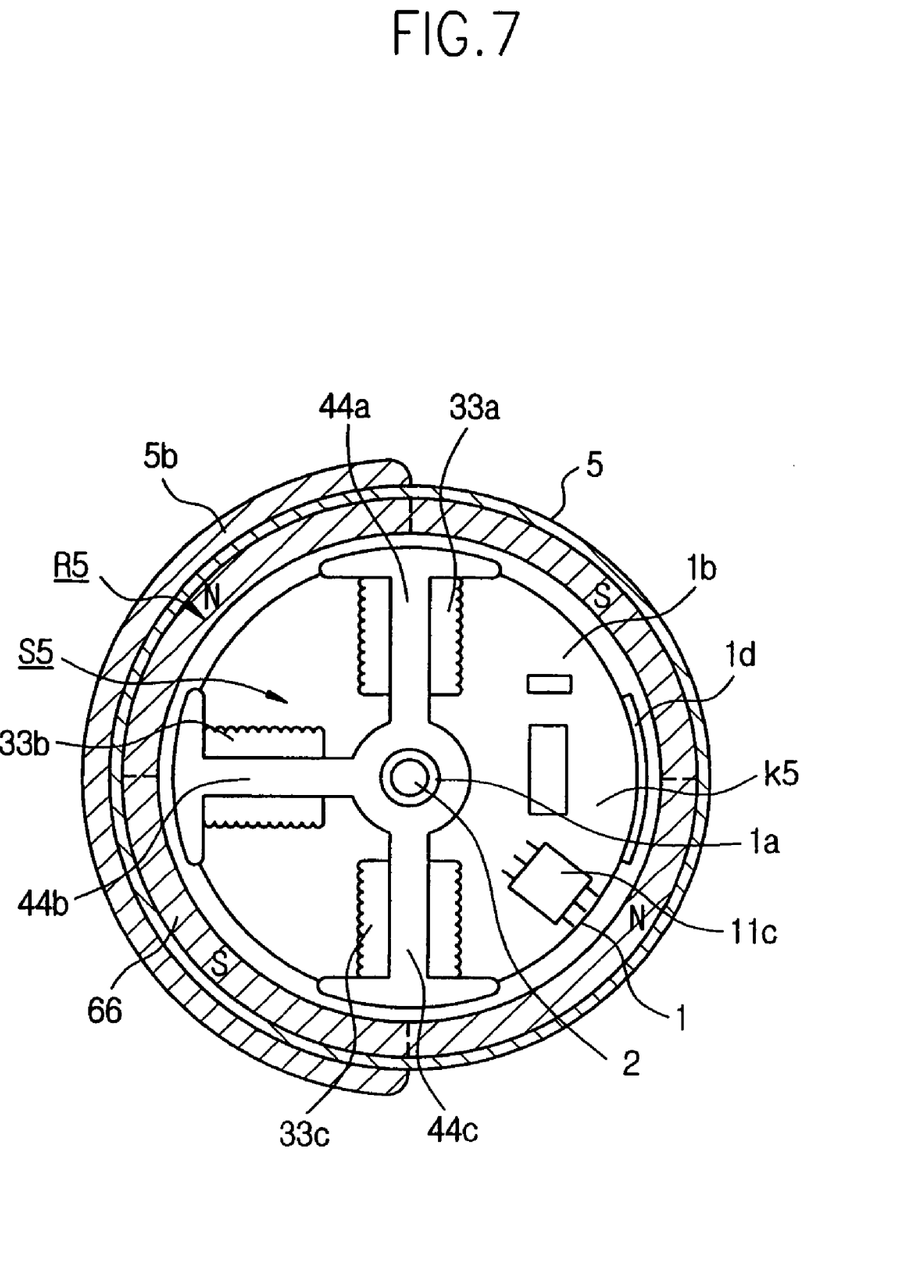
FIG. 7 is a cross-sectional view of the brushless vibration motor according to a first modified example of the present invention, shown in FIG. 6.

FIG. 7 shows a brushless motor according to a modified example of the present invention shown in FIG. 6, in which a stator S5 is provided with three salient poles. That is, one salient pole 44c is opposite to another salient pole 44a. An armature coil 33c wound on the salient pole 44c is, in series, connected to an armature coil 33a opposite thereto.

In this case, there is a space K5 enough to receive an armature coil in the brushless motor, in which the circuit member 11c having the one hole IC and another electric parts is received. Further, a narrow cylindrical magnet 66, constructing an eccentric rotor R5, has six magnetic poles of which three southern magnetic poles and three northern magnetic poles are alternatively arranged on the inner periphery of the rotor case.

Figure 8:
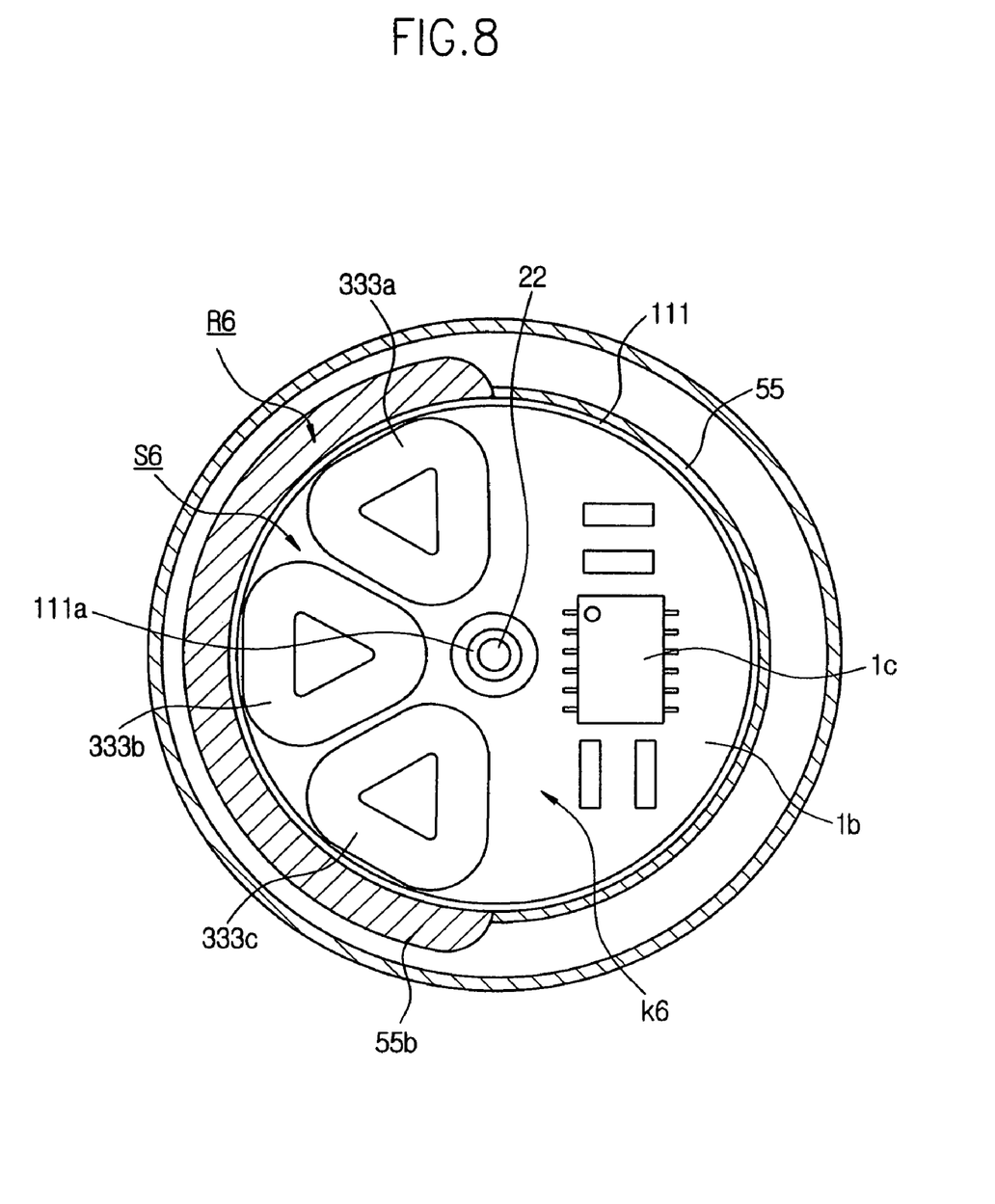
FIG. 8 is a cross-sectional view of a cored type of brushless vibration motor according to a third embodiment of the present invention, in which the brushless vibration motor has an axial gap between air-core armatures and a rotor.
Figure 9:
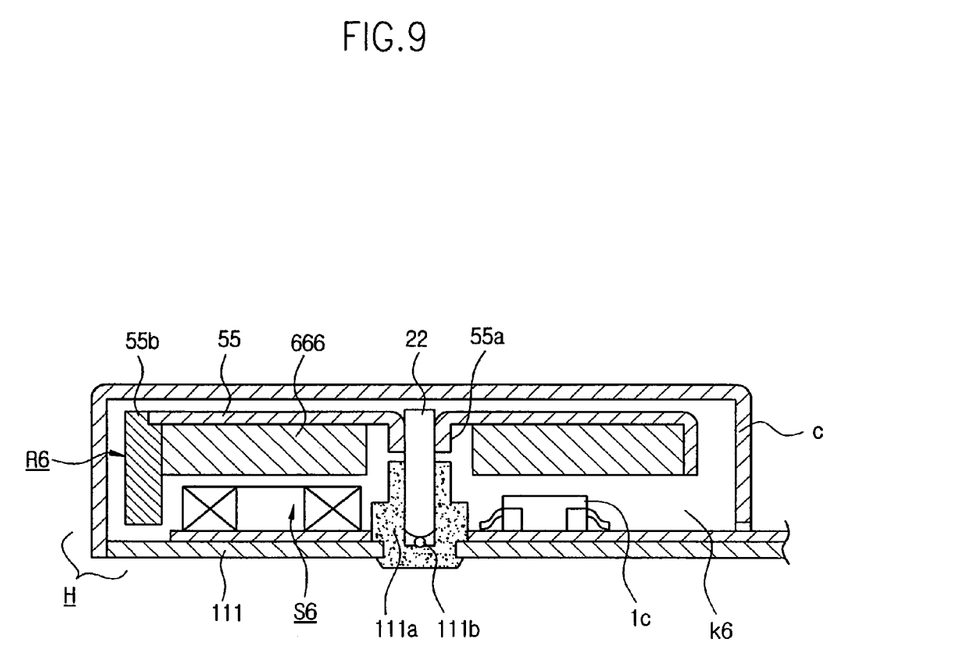
FIG. 9 is a longitudinally sectional view of the brushless vibration motor shown in FIG. 8.

FIGS. 8 and 9 show a compact brushless vibration motor according to a third embodiment of the present invention, in which the vibration motor has no core. In those drawings, a bearing 111a is integrally secured as a shaft supporting portion to a center portion of a stator base 111. Three air-core armature coils 333a, 333b and 333c are disposed around the bearing 111a on the stator base 111 at an even angular pitch of 60 degrees. Thus, a space K6 having a region in which three armature coils are disposed is formed in the brushless motor, in which the driving circuit member 1c having no a sensor is mounted.

Furthermore, a thrust bearing 111b consisting of a ball is disposed on a bottom surface of a thrust bearing 111a in order to decrease a sliding area of a shaft 22 for a purpose of reducing a braking force of a magnet 666 disposed in the rotor.

Meanwhile, the brushless vibration motor according to the third embodiment of the present invention has the same structure as that of the brushless vibration motor according to the first embodiment of the present invention, except that a ring type magnet 666 has four southern magnetic poles and four northern magnetic poles which are alternatively arranged, which is securely attached to a ceiling portion of the rotor case 55, and that the shaft 22 is press-fitted in a burring portion 55a. Such eccentric rotor R6 is rotatably mounted on the bearing 111a. An unbalance device such as an eccentric weight 55b is directly adhered to a part thereof to a periphery of a ring type of the flat magnet 666.

Figure 10:
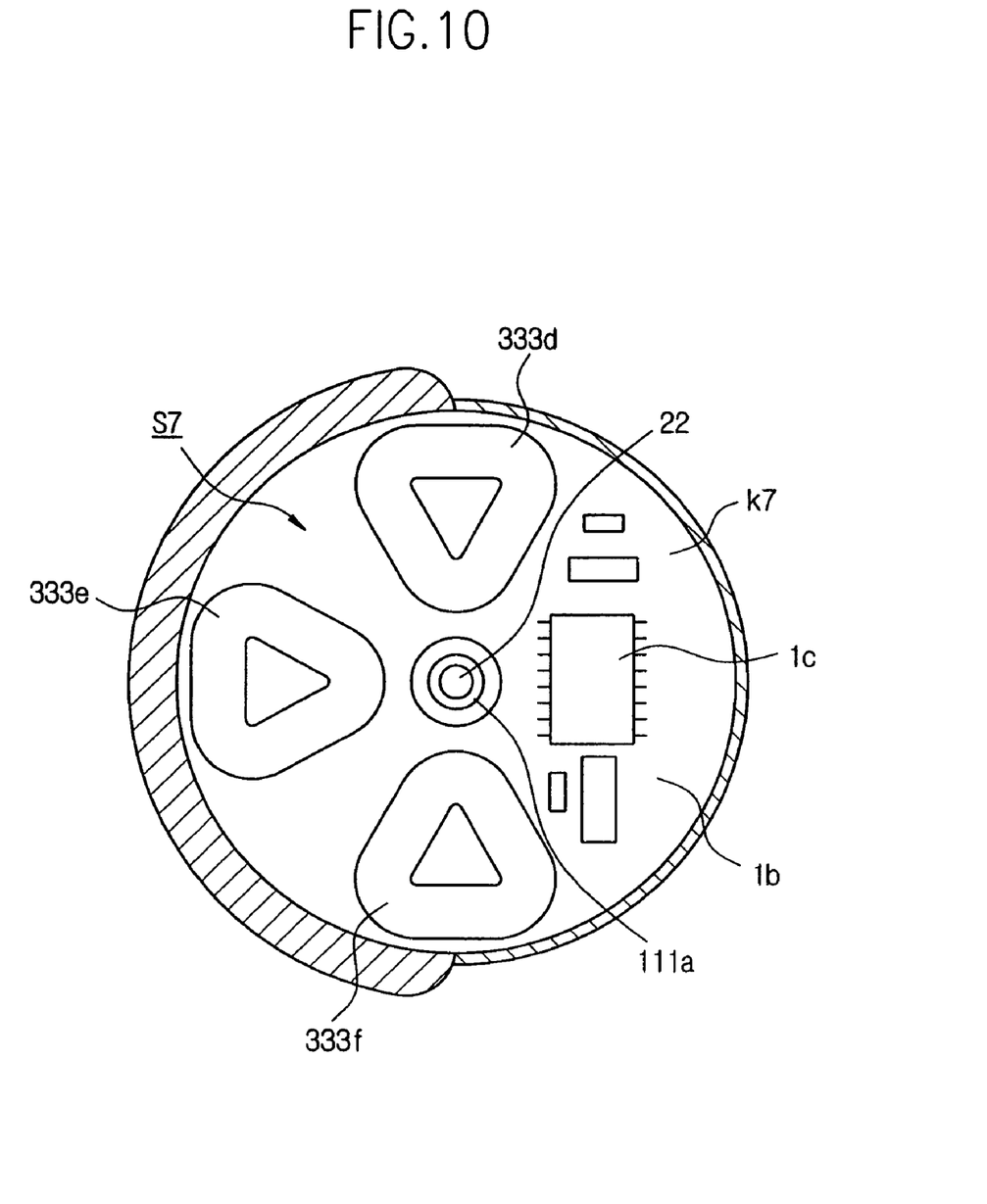
FIG. 10 is a cross-sectional view of the brushless vibration motor according to a modified example of the present invention, shown in FIG. 9.

FIG. 10 shows a brushless vibration motor according to a first modified example of the present invention as shown in FIG. 8, in which a stator S7 has three air-core armature coils 333d, 333e and 333f arranged at an even angular pitch of about 80 degrees. The stator S7 faces a thin cylindrical magnet 666, which has three southern magnetic poles and three northern magnetic poles alternatively arranged, leaving a gap therebetween.

In the case, there is a space K7 in the brushless vibration motor, which corresponds to an area of an armature coil and in which the circuit member 1c is disposed.

Furthermore, an angular pitch of three air-core armature coils can be changed in a range of 70 degrees to 100 degrees in a manner of changing the size and shape of the armature coil.

Figure 11:
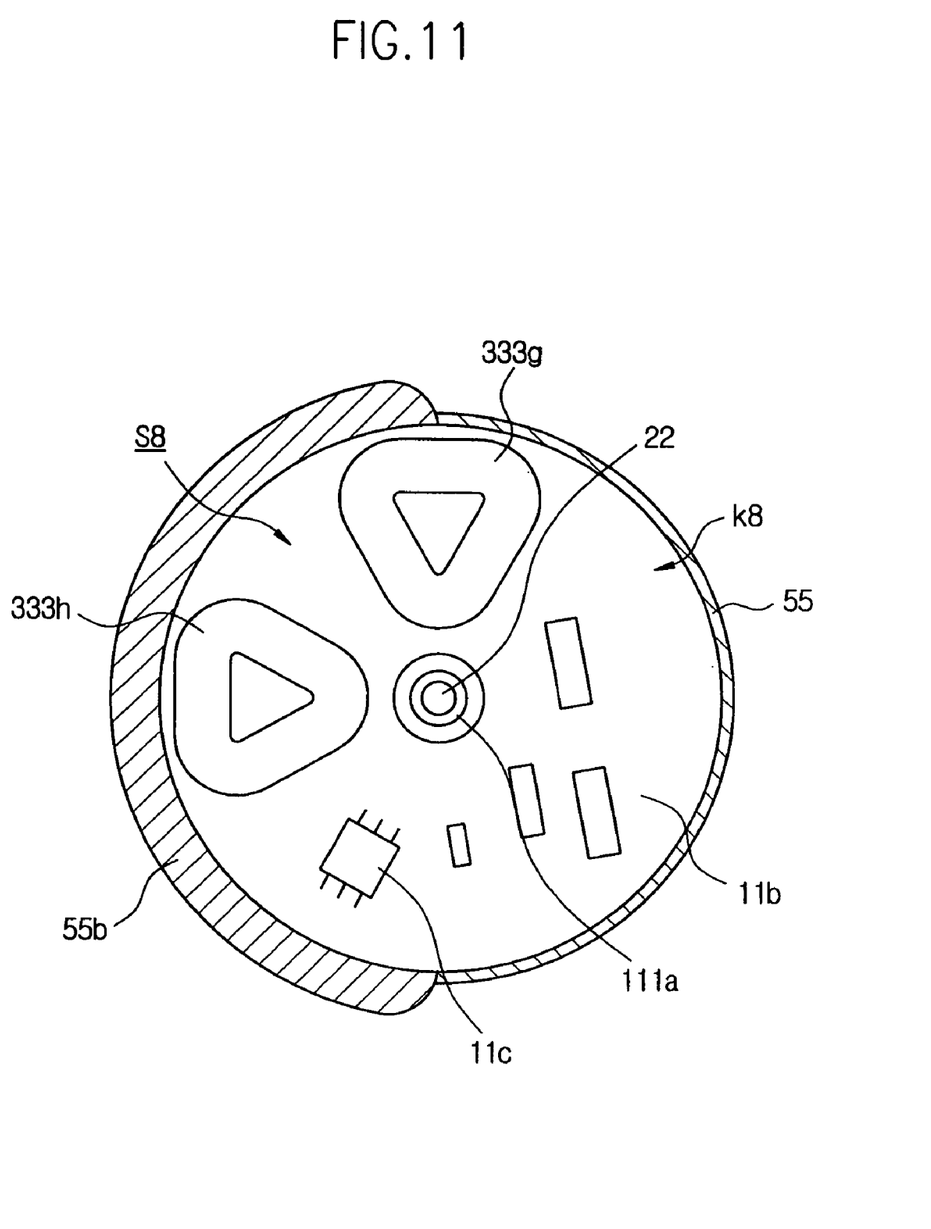
FIG. 11 is a cross-sectional view of a cored brushless vibration motor according to a fourth embodiment of the present invention, in which the brushless vibration motor has an axial gap between air-core armatures and a rotor.

FIG. 11 shows a brushless vibration motor according to a second modified example of the present invention, in which a stator S8 has two air-core armature coils 333g and 333h arranged on the stator base at an angular pitch of 90 degrees. There is a space K8 in the brushless vibration motor, which corresponds to an area of two armature coils and in which the circuit member 11c is disposed.

An eccentric rotor facing the stator S8 has a magnet in which two southern magnetic poles and two northern magnetic poles are alternatively arranged at an angular pitch of 90 degrees. However, the magnet may have six magnetic poles according to the angular pitch of the magnetic poles.

In addition, three air-core armature coils, as not shown, may be arranged at an angular pitch of 90 degrees in the brushless vibration motor, thereby obtaining a space corresponding to an area of an air-core armature coil.

Further, while being mainly mounted on the stator base as a part of the housing in the respective embodiments and modified examples, the shaft supporting portion may be mounted in a cover as the other part of the housing. That is, the shaft supporting portion can be constituted as like that of the brushless vibration motor shown in FIG. 3 of the Japanese laid-open Patent Publication No. Heisei 10-248203 which the present applicant had applied.

Meanwhile, the stator base can be formed with a printed circuit iron board instead of a fiberglass epoxy substrate 1b, on which the driving circuit member 1c is additionally mounted. Thereby, emitting heat from the driving circuit member can be preferably performed.

While the present invention has been particularly shown and described with reference to particular embodiments thereof, it will be understood by those skilled in the art that various changes in form and detail may be effected therein without departing from the spirit and scope of the invention as defined by the appended claims.

What is claimed is:

1. A brushless vibration motor comprising:
an eccentric rotor having a rotor case, a magnet which has alternatively arranged plural magnetic poles and which is arranged on an inner peripheral surface of the rotor case, and a semi-cylindrical weight disposed on a portion of an outer peripheral surface of the rotor case at a radial outside of the magnet;
a shaft for supporting the eccentric rotor;
a stator for driving the rotor, through a radial gap between the eccentric rotor and the stator, the stator being cooperated with the magnet of the eccentric rotor through the radial gap, the stator being cored type of stator which includes a stator base, a substrate additionally mounted on an upper surface of the stator base, and armature coils, in which the stator base has a stepped shaft supporting portion for supporting the shaft, in which the armature coils are wound and arranged on at least two salient poles of a stator core that is mounted onto the shaft, and in which a plurality of sites for mounting the armature coils are provided on the substrate; a driving circuit member for applying electric current to the armature coils, which is disposed in a space provided within the housing, wherein the space is corresponding to at least one armature coil;
a dummy core being risen from the stator base at an even angular pitch, which is arranged on an outer periphery of the stator base, wherein the angular pitch is corresponding to that of the salient poles arranged around the stator core; and a cover being attached at an edge to the stator base, which encloses the eccentric rotor and performs a protection of the eccentric rotor.

2. Abrushless vibration motor as claimed in claim 1, wherein the driving circuit member has no sensor.

3. Abrushless vibration motor as claimed in claim 1 wherein the stator has at least two salient poles which are disposed at an angular pitch of an integer times to a width of a magnetic pole and which have the armature coils wound thereon.

4. Abrushless vibration motor as claimed in claim 1, wherein the driving circuit member has at least one sensor.

* * * * *